United States Patent [19]

Newman et al.

[11] Patent Number: 4,689,251
[45] Date of Patent: Aug. 25, 1987

[54] ANTICAKING AND ANTIDUSTING COMPOSITION

[75] Inventors: Anthony W. Newman, Fort Worth; Michael L. Bishop, North Richland Hills, both of Tex.

[73] Assignee: DeSoto, Inc., Des Plaines, Ill.

[21] Appl. No.: 823,728

[22] Filed: Jan. 29, 1986

[51] Int. Cl.$^4$ .............................................. B05D 7/00
[52] U.S. Cl. .................................... 427/220; 252/384
[58] Field of Search ................... 427/220; 252/70, 384

[56] References Cited

U.S. PATENT DOCUMENTS

| | | | |
|---|---|---|---|
| 2,234,484 | 3/1941 | Weinig | 427/220 |
| 2,847,710 | 8/1958 | Pitzer | 427/220 |
| 4,316,811 | 2/1982 | Burns et al. | 427/220 |
| 4,342,797 | 8/1982 | Kober | 427/220 |
| 4,428,984 | 1/1984 | Shimizu et al. | 427/220 |
| 4,599,250 | 7/1986 | Cargk et al. | 427/220 |
| 4,605,568 | 8/1986 | Kober | 427/220 |

Primary Examiner—Norman Morgenstern
Assistant Examiner—Janyce A. Bell
Attorney, Agent, or Firm—Dressler, Goldsmith, Shore, Sutker & Milnamow, Ltd.

[57] ABSTRACT

An aqueous liquid anticaking and antidusting composition is disclosed which comprises from 35 to 60 parts of $C_2$–$C_6$ polyhydric alcohols and ethers thereof having a molecular weight up to 600, especially glycerin in admixture with from 20 to 30 parts of a sodium naphthalene sulfonate, and from 20 to 50 parts of water. The naphthalene component is selected from naphthalene and methyl-substituted derivatives thereof.

7 Claims, No Drawings

ANTICAKING AND ANTIDUSTING COMPOSITION

DESCRIPTION

1. Technical Field

This invention relates to aqueous compositions adapted to be spray applied onto hard crystalline materials to reduce fugitive dust and to minimize the tendency of such crystalline materials to cake on standing.

2. Background Art

Many hard crystalline materials, such as fertilizers, inorganic chemicals and mineral ores, tend to contain fines or to be friable and form fines, and these fines are a nuisance. Also, these materials tend to cake and form large stiff masses which are not easily handled, as is necessary to move them about. Some of these cakes are so large and so resistant to subdivision as to require explosives to break them up to allow handling.

It is desired to provide a sprayable liquid composition which will remain sprayable over a wide range of temperatures, including temperatures somewhat below the freezing point of water, and which will be effective when applied in small amount to minimize dusting and to reduce the caking tendencies for extended periods of time so that the coarse granular crystalline materials will remain easily movable despite long term storage.

DISCLOSURE OF INVENTION

In accordance with this invention, an aqueous anticaking and antidusting composition comprises from 35 to 60 parts of a $C_2$–$C_6$ polyhydric alcohol, and ethers thereof having a molecular weight of up to about 600, especially glycerin, in combination with from 20 to 30 parts of a sodium naphthalene sulfonic and from 20 to 50 parts of water, preferably from 25 to 40 parts of water.

All parts and proportions herein are by weight, unless otherwise specified.

The liquid compositions of this invention are particularly applicable when sprayed onto coarse granules of potash, such as potassium chloride or potassium sulfate and ammonium sulfate. Other hard crystalline materials which may be protected from dusting and caking using the compositions of this invention are illustrated by high density ammonium nitrate, and urea.

The typical coarse granules are usually in the range of 1 to 5 millimeters in diameter, usually from 2 to 3 millimeters.

The polyhydric alcohol component ties up water and this is important because water is an important part of the action of the composition in use. In addition to glycerin, which is preferred, one may use the other polyhydric alcohols shown in the examples, as well as diethylene glycol, dipropylene glycol, and polyethylene glycol and polyproylene glycols up to a molecular weight of 600.

The sodium naphthalene sulfonate is a known anticaking agent, albeit this agent alone is not totally effective. An important finding in this invention is that this known anticaking agent becomes more effective and its effectiveness is more durable in combination with glycerin or other polyhydric alcohols, and the water which that agent functions to tie up. While naphthalene is the agent primarily contemplated, it can be replaced by the corresponding methyl derivatives therefor, for example sodium methyl naphthalene, sodium dimethyl naphthalene and sodium trimethyl naphthalene.

The relative proportions of polyhydric alcohol and naphthalene sulfonate are important because the components become unstable and separate when either of them is present in excessive amount. Preferred proportions are from 38 to 50 parts of glycerin to from 22 to 28 parts of the sodium naphthalene sulfonate component.

The liquid compositions in this invention necessarily include water, and it is desirable to minimize the proportion of water which is used. On the other hand, a small excess of water can be tolerated, and can be used to adjust viscosity for sprayability.

The compositions of this invention are sprayed onto the granular mineral to be protected while the mineral is in motion, as for example while it is being tumbled or conveyed. The manner of spray application is itself well known and a matter of common knowledge in the field. From 0.3 to 5 pounds per ton represents a preferred teratment proportion in this invention, and best results are obtained when from 0.5 to 3 pounds per ton are applied. This represents an economical treatmwent which is highly effective and which introduces a minimal adulteration.

The inert particles which are sometimes introduced in anticaking and antidusting compositions, as illustrated in U.S. Pat. No. 4,001,378 may be used here as well, but they introduce little further benefit and are not recommended.

The compositions of this invention are sprayable liquids which are easily pumped and which do not solidify at temperatures well below the freezing point of water. The compositions are not flammable and do not form a hazardous vapor. Also, the product is not considered to be toxic.

EXAMPLE 1

A composition is made by stirring together 50 parts of an 88% aqueous glycerin and 50 parts of a 50% aqueous sodium naphthalene sulfonate. This composition was sprayed onto potassium chloride and potassium sulfate granules of average diameter about 1–2 millimeters and was found to contribute anticaking and antidusting properties which lasted for several months.

EXAMPLE 2

Example 1 is repeated substituting 1,2 ethandiol for glycerin. A similar result is obtained.

EXAMPLE 3

Example 1 is repeated substituting 1,2 propanediol for glycerin. A similar result is obtained.

What is claimed is:

1. An aqueous liquid anticaking and antidusting composition comprising, from 35 to 60 parts of $C_2$–$C_6$ polyhydric alcohols and ethers thereof having a molecular weight up to 600 in admixture with from 20 to 30 parts of a sodium naphthalene sulfonate in which the naphthalene is selected from naphthalene and methyl-substituted derivatives thereof, and from 20 to 50 parts of water.

2. A composition as recited in claim 1 in which sodium naphthalene sulfonate is used.

3. A composition as recited in claim 1 in which from 38 to 50 parts of glycerin are present together with from 22 to 28 parts of the sodium naphthalene component.

4. A composition as recited in claim 3 in which from 25 to 40 parts of water are present.

5. A method of treating hard crystalline minerals in coarse granular form to render the said granules resistant to caking and dusting, comprising spraying on said granules from 0.3 to 5 pounds per ton of the composition of claim 1.

6. A method as recited in claim 5 in which from 0.5 to 3 pounds per ton of the composition of claim 4 are sprayed on said granules.

7. A method as recited in claim 5 in which said granules are granules of potassium chloride, potassium sulfate.

* * * * *

UNITED STATES PATENT AND TRADEMARK OFFICE
CERTIFICATE OF CORRECTION

PATENT NO. : 4,689,251

DATED : August 25, 1987

INVENTOR(S) : Anthony W. Newman et al.

It is certified that error appears in the above-identified patent and that said Letters Patent is hereby corrected as shown below:

Column 1, line 36, "sulfonic" should read: --sulfonate--

Column 2, line 20, "treatmwent" should read: --treatment-- ; and

Claim 7 should read:

--7. A method as recited in claim 5 in which said granules are granules of potassium chloride, ammonium sulfate, or potassium sulfate.--

Signed and Sealed this

Twenty-third Day of February, 1988

Attest:

DONALD J. QUIGG

Attesting Officer

Commissioner of Patents and Trademarks